(12) United States Patent
Takada et al.

(10) Patent No.: US 10,078,176 B2
(45) Date of Patent: Sep. 18, 2018

(54) PLANAR ILLUMINATION DEVICE

(71) Applicant: MINEBEA CO., LTD., Kitasaku-gun, Nagano (JP)

(72) Inventors: Shohei Takada, Hamamatsu (JP); Keito Azumi, Osaka (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 95 days.

(21) Appl. No.: 15/014,578

(22) Filed: Feb. 3, 2016

(65) Prior Publication Data

US 2016/0231499 A1 Aug. 11, 2016

(30) Foreign Application Priority Data

Feb. 9, 2015 (JP) ................. 2015-023645

(51) Int. Cl.
*F21V 7/04* (2006.01)
*F21V 8/00* (2006.01)

(52) U.S. Cl.
CPC ........... *G02B 6/0088* (2013.01); *G02B 6/002* (2013.01); *G02B 6/0031* (2013.01); *G02B 6/0068* (2013.01); *G02B 6/0083* (2013.01)

(58) Field of Classification Search
CPC .. G02B 6/0023; G02B 6/0073; G02B 6/0088; G02B 6/0026; G02B 6/0068; G02B 6/0083; G02B 6/0055; G02B 6/0021; G02B 6/009; G02B 6/0091; G02B 6/0031; G02B 6/0085; G02B 6/0011; G02B 6/002; G02B 6/0065; G02B 6/0066; G02B 6/0025
See application file for complete search history.

(56) References Cited

U.S. PATENT DOCUMENTS

| 8,269,911 | B2 | 9/2012 | Watanabe et al. |
| 8,842,233 | B2 | 9/2014 | Oura |
| 2007/0263407 | A1* | 11/2007 | Sakai ................... G02B 6/0021 362/608 |
| 2009/0109368 | A1 | 4/2009 | Watanabe et al. |

(Continued)

FOREIGN PATENT DOCUMENTS

| CN | 101424824 A | 5/2009 |
| CN | 103308973 A | 9/2013 |

(Continued)

OTHER PUBLICATIONS espacenet.com, Description JP2009110825, all pages.*

(Continued)

*Primary Examiner* — Thien T Mai
(74) *Attorney, Agent, or Firm* — Oliff PLC

(57) ABSTRACT

A planar illumination device includes: a frame including a side wall; a circuit board including a mounted portion arranged on the side wall, and a folded portion folded with respect to the mounted portion; a plurality of point light sources arranged on the mounted portion; a light guiding plate that includes an incoming surface facing the plurality of point light sources and that is accommodated in the frame; and a fixing nail that is formed in the light guiding plate, protrudes from the incoming surface towards a part of the mounted portion where the plurality of point light sources are not arranged and arranges the mounted portion on the side wall.

10 Claims, 3 Drawing Sheets

(56) References Cited

U.S. PATENT DOCUMENTS

2011/0304796 A1* 12/2011 Lee .................. G02B 6/0021
                                                             349/62
2012/0287371 A1    11/2012 Oura
2013/0242614 A1     9/2013 Kurata et al.

FOREIGN PATENT DOCUMENTS

| JP | H11-52139 A    | 2/1999  |
| JP | 2008-218218 A  | 9/2008  |
| JP | 2009-110825 A  | 5/2009  |
| JP | 2012-79418 A   | 4/2012  |
| JP | 2012-237826 A  | 12/2012 |
| JP | 2013-50469 A   | 3/2013  |

OTHER PUBLICATIONS

Apr. 25, 2017 Office Action issued in Japanese Patent Application No. 2015-023645.
Oct. 24, 2017 Office Action issued in Japanese Patent Application No. 2015-023645.

* cited by examiner

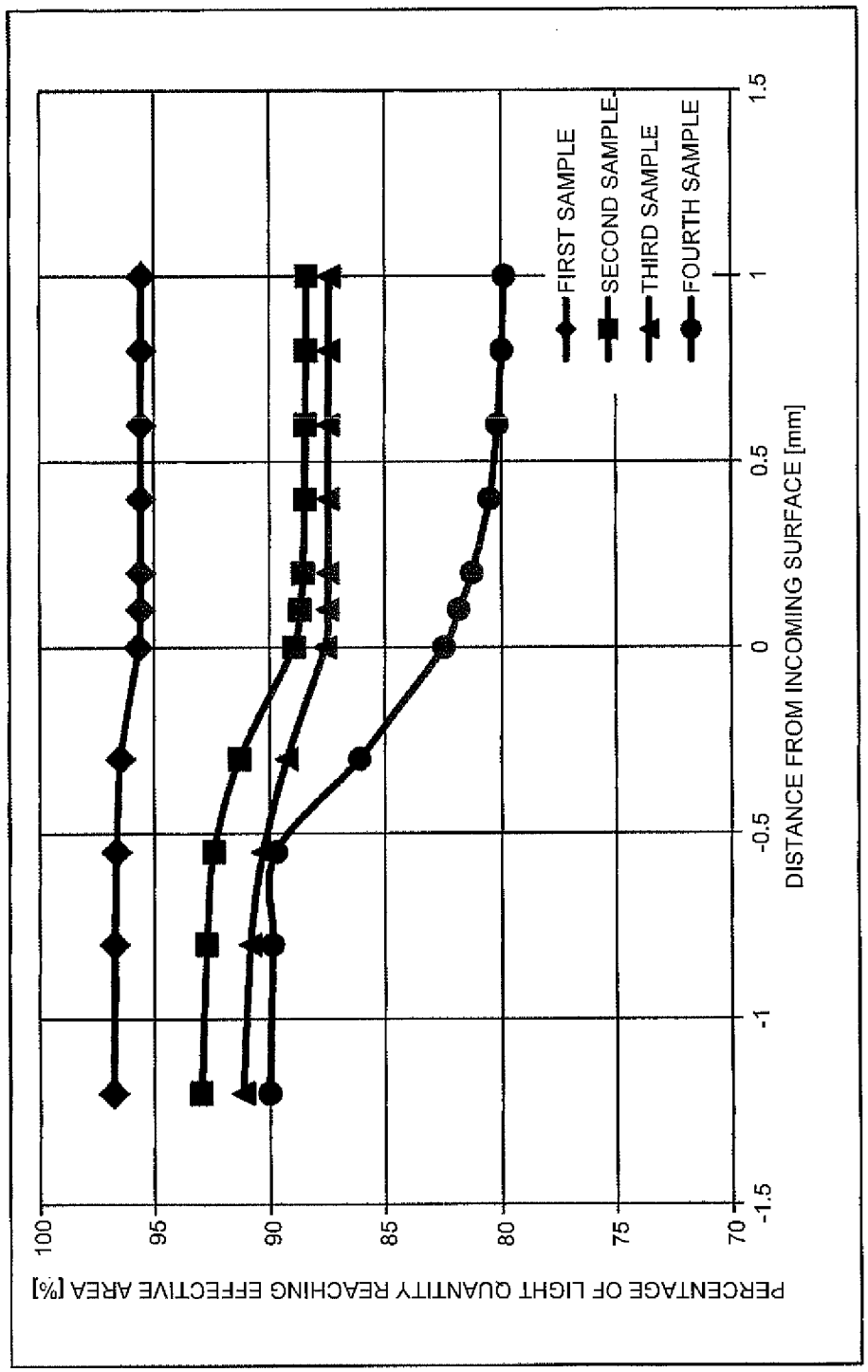

PLANAR ILLUMINATION DEVICE

CROSS-REFERENCE TO RELATED APPLICATION(S)

The present application claims priority to and incorporates by reference the entire contents of Japanese Patent Application No. 2015-023645 filed in Japan on Feb. 9, 2015.

BACKGROUND OF THE INVENTION

1. Field of the Invention

The present invention relates to a planar illumination device.

2. Description of the Related Art

Japanese Patent Application Laid-open No. 2008-218218 discloses a planar illumination device. In the planar illumination device, an easy folding line such as a slit is formed on a circuit board mounted with an LED so that a portion where the LED is not mounted is folded with respect to a portion where the LED is mounted, and the circuit board is folded and mounted on a frame, to thereby achieve reduction in thickness of the planer illumination device even if the circuit board having a width greater than a height dimension of the LED is used.

In this planar illumination device of Japanese Patent Application Laid-open No. 2008-218218, the folded portion of the circuit board is laid along a bottom surface of the frame, and a back surface of the mounted portion of the circuit board where the LED is mounted is fixed and adhered by a double coated adhesive tape onto a side wall surface of the frame.

Since restoring force for the folded portion to return to a state before the folding is small due to the formation of the easy folding line, force causing the double coated adhesive tape to peel off is difficult to work thereon, and since the mounted portion is able to be adhered closely to the frame, effect of radiating heat generated by the LED to the frame is increased, and thus the fixing thereof is able to be achieved securely over a long period of time.

However, just by the formation of the easy folding line through provision of the slit, under a harsh environment, such as under high temperature and high humidity, there is still concern over fluctuation and deterioration of illumination characteristics due to the circuit board (mounted portion) peeling off the frame.

SUMMARY OF THE INVENTION

It is an object of the present invention to at least partially solve the problems in the conventional technology.

Our planar illumination device includes: a frame including a side wall; a circuit board including a mounted portion arranged on the side wall, and a folded portion folded with respect to the mounted portion; a plurality of point light sources arranged on the mounted portion; a light guiding plate that includes an incoming surface facing the plurality of point light sources and that is accommodated in the frame; and a fixing nail that is formed in the light guiding plate, protrudes from the incoming surface towards a part of the mounted portion where the plurality of point light sources are not arranged and arranges the mounted portion on the side wall.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a graph illustrating arrangement of a reflective plate and an incoming state of light to a light guiding plate, in the embodiment according to the present invention;

FIG. 4 is a diagram illustrating which states the graph in FIG. 3 corresponds to.

DETAILED DESCRIPTION OF THE PREFERRED EMBODIMENTS

Hereinafter, modes for carrying out the present invention (hereinafter, referred to as "embodiment") will be described in detail, based on the appended drawings. Throughout the whole description of the embodiment, the same elements will be appended with the same numbers.

Figure 1A:
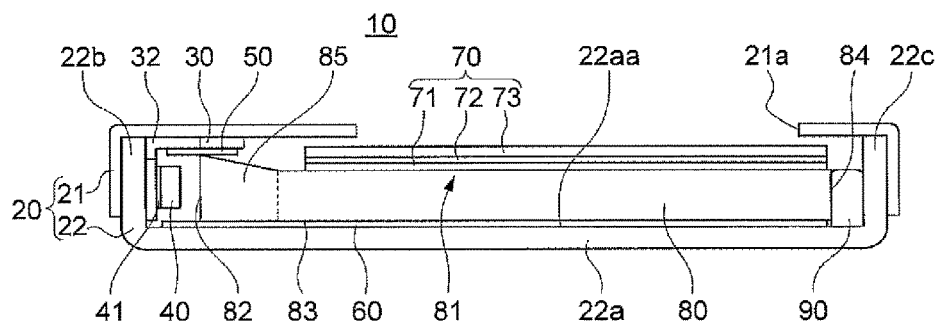
FIGS. 1A and 1B are diagrams illustrating a cross sectional configuration of a planar illumination device of an embodiment according to the present invention, FIG. 1A being a cross sectional view of a portion where a point light source is positioned, and FIG. 1B being a cross sectional view of a portion where the point light source is not positioned.
Figure 1B:
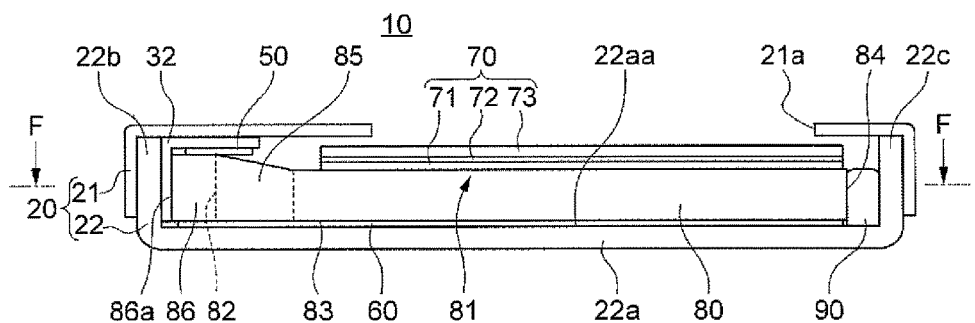

A planar illumination device of the embodiment according to the present invention is, for example, an illumination device that is able to be suitably used as a backlight of various liquid crystal display devices. FIGS. 1A and 1B are diagrams illustrating a cross sectional configuration of a planar illumination device 10 of the embodiment according to the present invention, FIG. 1A is a cross sectional view of a portion where a point light source 40 is positioned, and FIG. 1B is a cross sectional view of a portion where the point light source 40 is not positioned.

As illustrated in FIGS. 1A and 1B, the planar illumination device 10 of the embodiment according to the present invention includes a frame 20, a circuit board 30, the point light source 40, a reflecting plate 50, a reflecting sheet 60, an optical sheet 70, a light guiding plate 80, and a pressing unit 90.

Frame

The frame 20 includes an upper frame 21 arranged at an upper side in the figure and a lower frame 22 arranged at a lower side in the figure. At a central portion of the upper frame 21, an opening 21a, which is rectangular shaped, is provided, and light outgoing from an outgoing surface 81, which is an upper principal plane of the light guiding plate 80, and outgoing through the optical sheet 70 outgoes from the opening 21a.

The lower frame 22 is a portion that accommodates various members, and includes: a bottom portion 22a forming a bottom surface 22aa, which is rectangular shaped and faces upwards; and four side walls, which stand upwards from a periphery (four sides) of the bottom portion 22a. The circuit board 30 is arranged on a side wall 22b at a side where the point light source 40 is arranged. The pressing unit 90 is arranged on a side wall 22c opposite to the side wall 22b, the side wall 22c serving as a receiving surface that receives the pressing unit 90.

In this embodiment, although the frame 20 is configured to have the upper frame 21 and the lower frame 22, the embodiment is not limited to this example, and for example, the frame 20 may be configured to be formed of the lower frame 22 only.

Optical Sheet

The optical sheet 70 is arranged on the outgoing surface 81 of the light guiding plate 80, and is for improving uniformity of illumination light and making a state of field angle distribution and a polarization state of the illumination light appropriate. In this embodiment, although the optical sheet 70 formed of a diffusing sheet 71, a prism sheet 72, and a polarizing sheet 73 is illustrated, for example, if a diffusing element is formed on the outgoing surface 81 itself of the light guiding plate 80, the diffusing sheet 71 may be omitted. Depending on intended use of the planar illumination device 10, the optical sheet 70 may not be needed, and the embodiment is not limited to the inclusion of the optical sheet 70.

Reflecting Sheet

The reflecting sheet 60 is arranged on a reverse surface 83 of the light guiding plate 80, the reverse surface 83 facing the bottom surface 22aa of the lower frame 22. More specifically, the reflecting sheet 60 is arranged to be interposed between the reverse surface 83 of the light guiding plate 80 and the bottom surface 22aa of the lower frame 22. The reverse surface 83 of the light guiding plate 80 is a lower principal plane opposite to the outgoing surface 81.

As described above, by the arrangement of the reflecting sheet 60 on the reverse surface 83 of the light guiding plate 80, light leaked out from the reverse surface 83, the light of light that has outgone from the point light source 40 and has entered the light guiding plate 80, is able to be efficiently returned towards the outgoing surface 81 of the light guiding plate 80. Further, in this embodiment, as illustrated in FIG. 1A, the reflecting sheet 60 is arranged also at a position below the point light source 40, that is, at a position overlapping the point light source 40 in a top view thereof.

Accordingly, light emitted towards the bottom surface 22aa of the lower frame 22 from the point light source 40 is reflected by the reflecting sheet 60 and is able to be incident on an incoming surface 82 of the light guiding plate 80, and thus light utilization efficiency is able to be increased.

Circuit Board

The circuit board 30 is a board, on which a circuit for performing electric supply to the point light source 40, and the like is formed, and in this embodiment, a flexible printed circuit (FPC) is used therefor. In this embodiment, the LED (light emitting diode) is used as the point light source 40, but the point light source may be a laser diode (LD) or the like, and the embodiment is not limited to the use of the LED.

Figure 2A:
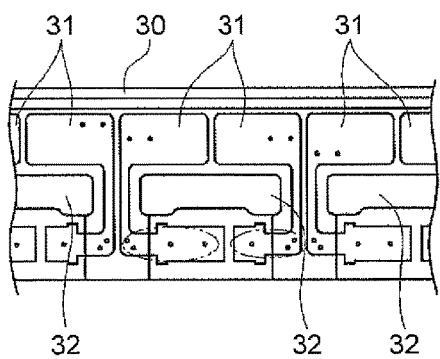
FIGS. 2A and 2B are front views of a circuit board of the embodiment according to the present invention as viewed from a side where point light sources are mounted, FIG. 2A being a diagram illustrating a state before the point light sources are arranged, and FIG. 2B being a diagram illustrating a state in which the point light sources have been arranged.
Figure 2B:
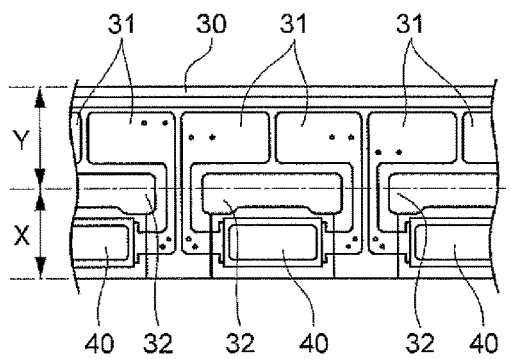

FIGS. 2A and 2B are front views of the circuit board 30 as viewed from a side where the point light source 40 is mounted, FIG. 2A is a diagram illustrating a state before the point light source 40 is arranged, and FIG. 2B is a diagram illustrating a state in which the point light source 40 has been arranged. FIGS. 2A and 2B are diagrams with a part of the circuit board 30 being enlarged, the part in a direction along a longitudinal direction (a direction vertical to a plane of paper in FIG. 1A and FIG. 1B) of the side wall 22b of the lower frame 22. Hereinafter, the direction along the side wall 22b of the lower frame 22 may be referred to as a length direction of the circuit board 30, and an up-down direction in FIGS. 2A and 2B may be referred to as a width direction of the circuit board 30.

As illustrated in FIGS. 2A and 2B, on the circuit board 30, a plurality of electric wirings 31 corresponding to a plurality of the point light sources 40 are formed, such that the plurality of point light sources 40 are arranged in the length direction. The plurality of point light sources 40 are, as illustrated in FIG. 1A, electrically connected to the electric wirings 31 of the circuit board 30 and fixed to the circuit board 30, via solder 41.

As illustrated in FIG. 2B, the circuit board 30 has slits 32 above portions where the point light sources 40 are mounted, and includes, by being folded at a portion of these slits 32, a mounted portion where the point light sources 40 are mounted (see a range of a two way arrow X in the figure) and a folded portion folded with respect to the mounted portion (see a range of a two way arrow Y in the figure). Although the circuit board 30 is partially illustrated in FIGS. 2A and 2B, an overall shape in a front view thereof is strip shaped.

As illustrated in FIG. 1A, the mounted portion of the circuit board 30 is arranged along an inner side of the side wall 22b of the lower frame 22, and the folded portion is folded towards the light guiding plate 80 at the portion of the slits 32 and arranged oppositely to an upper side of the light guiding plate 80.

Further, on a back side of the mounted portion of the circuit board 30, the back side being opposite to a side where the point light sources 40 are arranged, a double coated adhesive tape not illustrated is provided, for example, and the circuit board 30 is adhered and fixed onto the side wall 22b of the lower frame 22 via this double coated adhesive tape.

In this embodiment, the wiring in a portion surrounded by a circle in FIG. 2A is multiplexed by a blind via hole structure, to take measures against disconnection of the electric wirings. As described above, since the wirings are able to be multiplexed in a direction vertical to a plane of paper in FIGS. 2A and 2B by the use of the blind via hole structure, as compared to multiplexing in the width (up-down) direction of the circuit board 30, a width of the mounted portion of the circuit board 30 where the point light sources 40 are provided is able to be reduced.

As illustrated in FIGS. 1A and 1B, the width of this mounted portion influences a thickness of the planar illumination device 10, and thus by multiplexing the wirings with the blind via hole structure, the thickness of the planar illumination device 10 is able to be reduced. In this embodiment, although the electric wirings are multiplexed as a countermeasure against disconnection, the electric wirings are not necessarily multiplexed. Further, even if the electric wirings are multiplexed, the embodiment is not limited to the electric wirings multiplexed with the blind via hole structure.

Reflecting Plate

As illustrated in FIG. 1A and FIG. 1B, the reflecting plate 50 is arranged on a side of the folded portion of the circuit board 30, the side opposite to the light guiding plate 80. When the reflecting plate 50 is arranged as described above, light emitted upwards from the point light sources 40 is reflected by the reflecting plate 50 and is able to be incident on the incoming surface 82 of the light guiding plate 80, and thus light utilization efficiency is able to be increased. Although a portion of one point light source 40 is illustrated in FIG. 1A, portions of the remaining point light sources 40 not illustrated are similarly configured.

Figure 4:
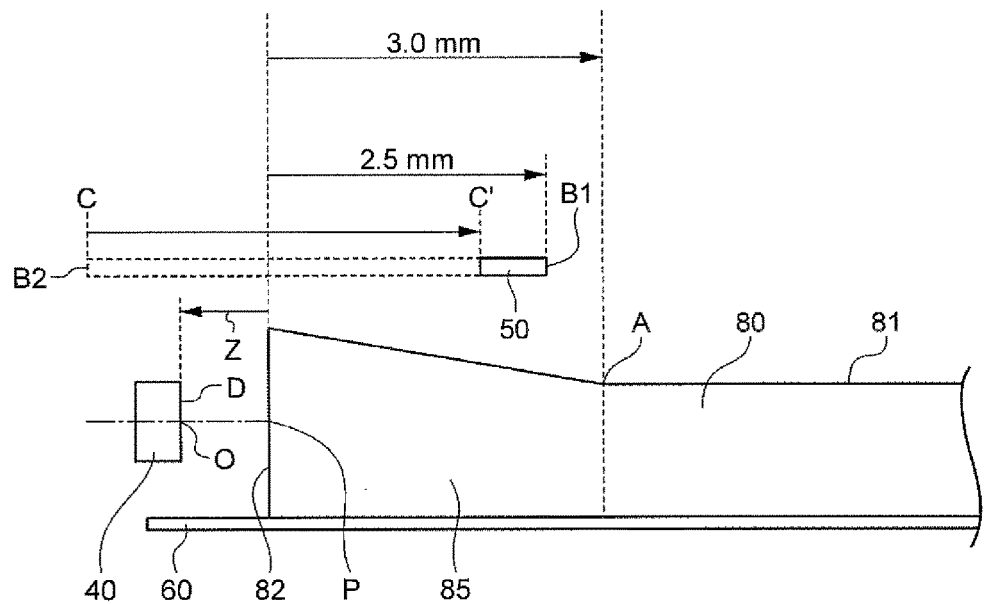

With reference to FIG. 3 and FIG. 4, the reflecting plate 50 will now be described in detail. First, with reference to FIG. 4, which states the graph illustrated in FIG. 3 represents will be described.

A unit of a horizontal axis of the graph in FIG. 3 is "mm", and a negative value indicates a distance away from the light guiding plate 80 (to the left in FIG. 4) and a positive value indicates a distance towards the light guiding plate 80 (to the right in FIG. 4), with the incoming surface 82 illustrated in FIG. 4 being the origin, 0 mm, and this origin, 0 mm, being a reference position.

Further, where a total light quantity of light emitted from the point light sources 40 is 100%, a vertical axis thereof represents proportion of light quantity of light that reaches an area (effective area) of the outgoing surface 81 of the light guiding plate 80 in %.

A light introducing guide portion 85, which will be described later, and which guides light from the incoming surface 82 towards the outgoing surface 81, is provided in the light guiding plate 80, and a length from the incoming surface 82 to an end A of the light introducing guide portion 85 is 3.0 mm.

An end portion B1 of the reflecting plate 50 on a light guiding plate 80 side (right side in the figure) is positioned at a position 2.5 mm from the incoming surface 82, and first to fourth samples in the graph of FIG. 3 illustrate how the percentage of light quantity reaching the effective area changes when a position of an end portion B2 opposite to the end portion B1 of the reflecting plate 50 is changed from C towards Cr in FIG. 4.

The first sample is when a distance from the incoming surface 82 to a light emitting face D of the point light source 40 (see an arrow Z) is 0.25 mm, that is, when the light emitting face D is positioned at −0.25 mm on the horizontal axis of the graph, and as illustrated with a dashed line, the first sample is in a state in which an optical axis center O of the point light source 40 matches the center P of an up-down width of the incoming surface 82.

Further, all of the second to fourth samples are when the distance from the incoming surface 82 to the light emitting face D of the point light source 40 (see the arrow Z) is 0.55 mm, that is, when the light emitting face D is positioned at −0.55 mm on the horizontal axis of the graph, and the point light sources 40 of the second to fourth samples are respectively arranged at different positions in an up-down direction in FIG. 4.

Specifically, in the second sample, similarly to the first sample, the optical axis center O of the point light sources 40 matches the center P of the up-down width of the incoming surface 82, and in the third sample, the point light sources 40 are arranged at a lower side, such that the optical axis center O of the point light sources 40 is positioned 0.45 mm below the center P of the up-down width of the incoming surface 82.

On the contrary, in the fourth sample, the point light sources 40 are arranged at an upper side, such that the optical axis center O of the point light sources 40 is positioned 0.45 mm above the center P of the up-down width of the incoming surface 82. Further, the reflecting sheet 60 is provided, not only on the lower surface of the light guiding plate 80, but also up to a lower side of the point light sources 40.

Next, with reference to the graph in FIG. 3, the reflecting plate 50 will be described. In the first sample, when the end portion B2 opposite to the end portion B1 of the reflecting plate 50 is on a negative side than the position, −0.25 mm, that is, when the reflecting plate 50 is in a state of overlapping the point light sources 40 in a top view thereof, the percentage of light quantity reaching the effective area is high, but when the end portion 52 is on a more positive side than the position, 0.25 mm, that is, as the reflecting plate 50 starts to no longer overlap the point light sources 40 in the top view, the percentage of light quantity reaching the effective area is decreased.

Further, in the second to fourth samples, when the end portion B2 opposite to the end portion B1 of the reflecting plate 50 is on a negative side of the position, −0.55 mm, that is, when the reflecting plate 50 is in a state of overlapping the point light sources 40 in a top view thereof, the percentage of light quantity reaching the effective area is high, but when the end portion 52 is on a more positive side of the position, −0.55 mm, that is, as the reflecting plate 50 starts to no longer overlap the point light sources 40, the percentage of light quantity reaching the effective area is decreased.

In view of the above, the reflecting plate 50 is preferably provided from above the plurality of point light sources 40 to above the light guiding plate 80, that is, from a position overlapping the plurality of point light sources 40 to a position overlapping the light guiding plate 80 in the top view. The position overlapping the plurality of point light sources 40 includes a case where the end portion 52 of the reflecting plate 50 matches the position of the light emitting face D of the point light source 40.

The above described increase in the percentage of light quantity reaching the effective area by the provision of the reflecting plate 50 from the position overlapping the plurality of point light sources 40 to the position overlapping the light guiding plate 80 is considered to be achieved because, for example, light emitted towards the slits 32 (see FIG. 1A) of the circuit board 30 from the point light sources 40 is caused to be reflected by the reflecting plate 50 without escaping through the slits 32, and to be able to enter the light guiding plate 80 from the incoming surface 82.

From the graph in FIG. 3, the following is also found with respect to the up-down direction position where the point light sources 40 are arranged. First, from the second to fourth samples having the same separation distance of the point light sources 40 from the incoming surface 82, it is found that since the second sample having the optical axis center O of the point light sources 40 matching the center P of the up-down width of the incoming surface 82 has high percentage of light quantity reaching the effective area, and the third sample and fourth sample having the optical axis centers O of the point light sources 40 deviated upward and downward with respect to the center P of the up-down width of the incoming surface 82 have lower percentage of light quantity reaching the effective area than the second sample, preferably the optical axis center O of the point light sources 40 substantially matches the center P of the up-down width of the incoming surface 82.

It is considered that the third sample having the optical axis center O deviated by 0.45 mm downwards from the center P of the up-down width of the incoming surface 82 has less change in the light quantity reaching the effective area when the end portion 32 opposite to the end portion B1 of the reflecting plate 50 is brought closer towards the end portion B1 (that is, when the reflecting plate 50 is made shorter), than the fourth sample having the optical axis center O deviated by 0.45 mm upwards from the center P of the up-down width of the incoming surface 82; because the reflecting sheet 60 is arranged up to the lower side of the point light sources 40.

That is, it is considered that when the point light sources 40 are arranged to be positioned at the lower side, percentage of light emitted below the incoming surface 82 is increased, but the light emitted towards a region below the incoming surface 82 is reflected by the reflecting sheet 60 and is able to be incident on the incoming surface 82, and thus influence on the light quantity reaching the effective area when the optical axis center O is offset with respect to the center P of the up-down width of the incoming surface 82 is small. On the contrary, as found from the results of the fourth sample, when the optical axis center O of the point light sources 40 is arranged to be deviated upwards from the center P, as the end portion B2 of the reflecting plate 50 separates from the point light sources 40, the light quantity reaching the effective area is significantly decreased. However, when the reflecting plate 50 is arranged to be extended to a position overlapping the point light sources 40 in the top view, this reduction in the light quantity is able to be kept small. Therefore, by extending and arranging the reflecting plate 50 up to the position overlapping the point light sources 40, even if the arrangement position of the mounted portion of the circuit board 30 mounted with the point light sources 40 with respect to the side wall 22*b* or the mounting position of the point light sources 40 with respect to the mounted portion is deviated in the up-down direction, large reduction in the light quantity will not be caused. That is, a configuration with illumination characteristics hardly influenced by assembly errors upon manufacture thereof (a configuration with excellent robustness) is able to be achieved.

Further, when the first and second samples having the optical axis centers O of the point light sources 40 matching the center P of the up-down width of the incoming surface 82 are compared with each other, it is found that the point light sources 40 are preferably positioned near the incoming surface 82 in terms of percentage of light quantity reaching the effective area, since the first sample with the light emitting face D positioned near the incoming surface 82 has higher percentage of light quantity reaching the effective area.

Light Guiding Plate

The light guiding plate 80 is formed: of an optically transparent material, such as a resin material like an acrylic or a polycarbonate, or glass; and in a rectangular flat plate shape. In order to reduce the thickness of the planar illumination device 10, the light guiding plate 80 is also desirably thin, and in view of this, the light guiding plate 80 is preferably formed of a resin material, which is hard to be cracked even if the thickness is thin and which has high formability.

As illustrated in FIG. 1A, the light guiding plate 80 of this embodiment is configured such that a thickness thereof at a side of the incoming surface 82, which is an end face at a side where the plurality of point light sources 40 are arranged in a row, is thicker than a thickness of a portion thereof serving as the outgoing surface 81 of light where the optical sheet 70 is arranged. That is, the light guiding plate 80 includes, at the incoming surface 82 side thereof, the light introducing guide portion 85 having thickness that gradually decreases from the incoming surface 82 side towards an end face 84 opposite to the incoming surface 82.

By the provision of this light introducing guide portion 85, even if point light sources 40 having an up-down direction height dimension larger than the thickness of the portion of the outgoing surface 81 of light are used in FIG. 1A, the incoming surface 82 having a width (thickness) that is able to sufficiently receive light from the point light sources 40 is able to be realized, and light incident on the incoming surface 82 is able to be guided towards the outgoing surface 81.

The light guiding plate 80 is not necessarily provided with the light introducing guide portion 85, and (portions of) the incoming surface 82 and outgoing surface 81 may be formed with substantially the same thickness without the above described light introducing guide portion 85.

As illustrated in FIG. 1B, at positions of the light guiding plate 80, the positions where the point light sources 40 of the circuit board 30 are not mounted, the light guiding plate 80 has fixing nails 86 protruding towards the mounted portion from the incoming surface 82, the fixing nails 86 directed to a part of the mounted portion, the part where the point light sources 40 are not arranged.

Figure 5:
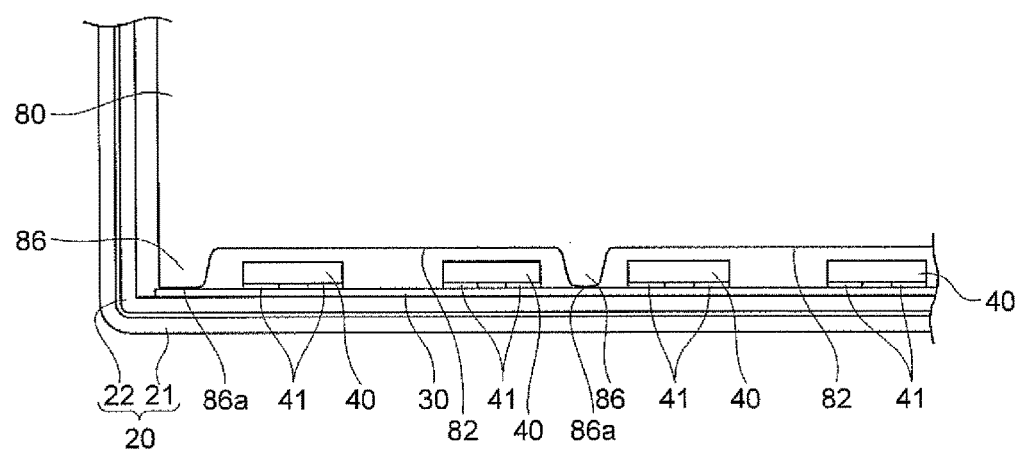
FIG. 5 is a partial cross sectional view of a point light source side along an F-F line in FIG. 1B.

FIG. 5 is a partial cross sectional view of a point light source 40 side along an F-F line illustrated in FIG. 1B. As illustrated in FIG. 5, the fixing nails 86 are formed so that farther the distance from the incoming surface 82 of the light guiding plate 80 is, the narrower the width becomes, and distal end surfaces 86*a* thereof abut against the mounted portion of the circuit board 30 where the point light sources 40 are mounted.

In this embodiment, although the fixing nails 86 are arranged in the part of every two spaces between the point light sources 40 and where the point light sources 40 are not arranged, how many of the fixing nails 86 are to be provided may be determined as appropriate. For example, the fixing nails 86 may be provided at every position between the point light sources 40, or the fixing nails 86 may be provided at every three positions between the point light sources 40.

Further, as illustrated in FIG. 1B, the fixing nails 86 are formed with a thickness (up-down direction width) that is the same as the thickness (up-down direction width) of the incoming surface 82, but the embodiment is not limited to this example. For example, the fixing nails 86 may have a thickness (up-down direction width) less than the up-down direction thickness (up-down direction width) of the incoming surface 82. Further, the positions where the fixing nails 86 are arranged may be at an up-down direction central portion of the incoming surface 82, or at an end (upper side in the figure) of the incoming surface 82, the end at a folded portion side of the circuit board 30.

As described above, since the mounted portion of the circuit board 30 is arranged on the side wall 22*b* of the lower frame 22 with the fixing nails 86 abutting against the circuit board 30, the circuit board 30 is restricted from moving in a direction of peeling off the side wall 22*b* and the circuit board 30 is prevented from peeling off. Therefore, even under a harsh environment, such as under high temperature and high humidity, the circuit board 30 is prevented from peeling off, and as compared to conventional planar illumination devices, the planar illumination device 10 having even more excellent long term reliability is able to be obtained.

Further, as found from FIG. 5, the fixing nails 86 are provided with a gap formed between the point light sources 40 and the incoming surface 82 of the light guiding plate 80. Since the point light sources 40 generate heat when emitting light, if the incoming surface 82 directly contacts the point light sources 40, that heat is transferred to the light guiding plate 80 and there is a risk that the light guiding plate 80 may be deteriorated, but like this embodiment, when the light guiding plate 80 is made not to contact the point light sources 40 by use of the fixing nails 86, deterioration of the light guiding plate 80 is able to be kept small.

However, when the point light sources 40 are closer to the incoming surface 82 as described with reference to the graph in FIG. 3, the percentage of light quantity reaching the effective area is increased, and thus the gap provided between the point light sources 40 and the incoming surface 82 of the light guiding plate 80 is preferably kept at the minimum gap required in order to keep the deterioration of the light guiding plate 80 by the heat generation of the point light sources 40 low.

Further, by the presence of the gap, the heat from the point light sources 40 becomes easy to escape and cooling efficiency is able to be increased, and thus, for example, reduction in light emission efficiency due to temperature increase of the LED is also able to be kept low.

Furthermore, by the mounted portion of the circuit board 30 being firmly fixed without peeling off the side wall 22b of the lower frame 22, heat radiation efficiency to the lower frame 22 is able to be increased, too.

Pressing Unit

As illustrated in FIGS. 1A and 1B, the pressing unit 90 is arranged on the end face 84 opposite to the incoming surface 82 of the light guiding plate 80, and presses the light guiding plate 80 so that the fixing nails 86 of the light guiding plate 80 bias the mounted portion of the circuit board 30 towards the side wall 22b of the lower frame 22. Thereby, even more surely, the circuit board 30 is able to be prevented from peeling off the side wall 22b of the lower frame 22.

In this embodiment, although an elastic body is provided as the pressing unit 90, between the side wall 22c on the end face 84 side of the lower frame 22 provided on the end face 84 side opposite to the incoming surface 82 of the light guiding plate 80 and the end face 84 opposite to the incoming surface 82 of the light guiding plate 80, and more specifically, a rubber member is used as the elastic body; the elastic body is not necessarily limited to the rubber member, and for example, a spring or the like may be used instead.

Although the present invention has been described based on the embodiment, the present invention is not limited to this embodiment, and various modifications may be made without departing from the gist of the embodiment. For example, although in the above described embodiment, the case in which the folded portion of the circuit board 30 is folded to be positioned above the light guiding plate 80 is illustrated, the folded portion may be folded to a lower side of the light guiding plate 80, or may be folded to an upper side and the lower side of the light guiding plate 80.

According to the embodiment of the present invention, it is possible to provide a planar illumination device, which is able to prevent a circuit board from peeling off a frame, and which has even more excellent long-term reliability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination device, comprising:
   a frame including a side wall;
   a circuit board including a mounted portion arranged on the side wall, and a folded portion folded with respect to the mounted portion, and having a slit between the mounted portion and the folded portion;
   a plurality of point light sources arranged on the mounted portion;
   a light guiding plate that includes an incoming surface facing the plurality of point light sources and that is accommodated in the frame;
   a fixing nail that is formed in the light guiding plate, protrudes from the incoming surface towards a part of the mounted portion where the plurality of point light sources are not arranged and arranges the mounted portion on the side wall; and
   a reflecting plate, wherein:
   the folded portion is folded towards the light guiding plate at the slit of the circuit board so as to face the light guiding plate, and
   the reflecting plate is arranged between a surface of the folded portion and the light guiding plate, wherein the surface of the folded portion faces the light guiding plate, so as to cover at least a part of the slit of the circuit board.

2. The planar illumination device according to claim 1, wherein the fixing nail is formed to form a gap between the plurality of point light sources and the incoming surface.

3. The planar illumination device according to claim 1, further comprising a pressing unit that is arranged on an end face of the light guiding plate, the end face being opposite to the incoming surface, and that presses the light guiding plate so that the fixing nail biases the mounted portion towards the side wall.

4. The planar illumination device according to claim 3, wherein
   the frame includes an end face side side wall provided on an end face side opposite to the incoming surface of the light guiding plat, and
   the pressing unit is an elastic body arranged between the end face opposite to the incoming surface of the light guiding plate and the end face side wall.

5. The planar illumination device according to claim 1, wherein the reflecting plate is provided from a position overlapping the plurality of point light sources to a position overlapping the light guiding plate in a top view.

6. The planar illumination device according to claim 1, wherein the fixing nail is configured such that a width of the fixing nail near the incoming surface is wider than a width of the fixing nail away from the incoming surface in a top view.

7. The planar illumination device according to claim 1, further comprising a reflecting sheet arranged on a surface of the light guiding plate, wherein the surface of the light guiding plate faces a bottom surface side of the frame, wherein the reflecting sheet is provided up to a position overlapping the plurality of point light sources in a top view.

8. The planar illumination device according to claim 1, wherein the light guiding plate includes a light introducing guide portion at an incoming surface side thereof, the light introducing guide portion having thickness that gradually decreases from the incoming surface side towards an end face side opposite to the incoming surface.

9. The planar illumination device according to claim 1, wherein the fixing nail is arranged at a side of an end of the incoming surface, the side of the end being nearer to the folded portion of the circuit board.

10. The planar illumination device according to claim 1, wherein
   the slit of the circuit board includes a folded portion side region formed in the folded portion and a mounted portion side region formed in the mounted region, and the reflecting plate is arranged so as to cover at least a part of the folded portion side region of the slit and not to cover the mounted portion side region of the slit.

\* \* \* \* \*